United States Patent
Nanivadekar et al.

(10) Patent No.: US 10,705,925 B2
(45) Date of Patent: Jul. 7, 2020

(54) SATISFYING RECOVERY SERVICE LEVEL AGREEMENTS (SLAS)

(71) Applicant: HEWLETT PACKARD ENTERPRISE DEVELOPMENT LP, Houston, TX (US)

(72) Inventors: Mandar Nanivadekar, Bangalore (IN); Veeresh Mallappa Anami, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 110 days.

(21) Appl. No.: 15/469,163

(22) Filed: Mar. 24, 2017

(65) Prior Publication Data
US 2018/0276082 A1    Sep. 27, 2018

(51) Int. Cl.
*G06F 16/11* (2019.01)
*G06F 11/14* (2006.01)

(52) U.S. Cl.
CPC ...... *G06F 11/1469* (2013.01); *G06F 11/1456* (2013.01); *G06F 11/1461* (2013.01); *G06F 11/1464* (2013.01); *G06F 11/1451* (2013.01); *G06F 16/125* (2019.01)

(58) Field of Classification Search
CPC ............ G06F 11/1469; G06F 11/1461; G06F 11/1464; G06F 16/125; G06F 11/1451
See application file for complete search history.

(56) References Cited

U.S. PATENT DOCUMENTS

| | | | | |
|---|---|---|---|---|
| 6,173,377 B1 * | 1/2001 | Yanai | ............. | G06F 3/0601 711/154 |
| 6,314,502 B1 | 11/2001 | Piersol | | |
| 6,625,705 B2 * | 9/2003 | Yanai | ............. | G06F 3/0601 711/161 |
| 7,467,329 B1 * | 12/2008 | Keeton | ............. | G06F 11/008 714/15 |
| 7,509,316 B2 * | 3/2009 | Greenblatt | ........ | G06F 17/30067 |

(Continued)

OTHER PUBLICATIONS

Unknown, "Performing Backup and Recovery in Real Application Clusters Environment", Oracle9i Real Application Clusters Administration, Release 2 (9.2), Part No. A96596-01, Jul. 1, 2002, 12 pages.

*Primary Examiner* — Christopher D Birkhimer
(74) *Attorney, Agent, or Firm* — Hewlett Packard Enterprise Patent Department

(57) ABSTRACT

Examples provided herein describe a system and method for satisfying recovery service level agreements (SLAs). For example, a first entity may determine that a first recovery operation is to be performed at a first storage device. The first entity may then determine that the first storage device is available. Responsive to determining that the first storage device is available, the first entity may establish a data connection with a first storage device and may perform a first recovery operation at the first storage device. The first entity may receive a second storage device availability message from a second entity that requests a second recovery operation at the first storage device and may facilitate communication with the second entity. The first entity may then perform the second recovery operation at the first storage device and communicate the recovered data to the second entity.

17 Claims, 5 Drawing Sheets

(56) References Cited

U.S. PATENT DOCUMENTS

| | | | | |
|---|---|---|---|---|
| 7,536,585 B1* | 5/2009 | Keeton | G06F 11/008 | 714/33 |
| 7,831,861 B1* | 11/2010 | Greene | G06F 11/1469 | 714/15 |
| 8,156,375 B1* | 4/2012 | Greene | G06F 11/1469 | 707/685 |
| 8,234,517 B2 | 7/2012 | Bamford et al. | | |
| 8,275,864 B1 | 9/2012 | Slaughter et al. | | |
| 9,037,900 B2* | 5/2015 | Fredin | G06F 13/4022 | 714/42 |
| 9,384,051 B1 | 7/2016 | Chopra et al. | | |
| 9,417,968 B2* | 8/2016 | Dornemann | G06F 3/0664 | |
| 9,448,731 B2* | 9/2016 | Nallathambi | G06F 3/0619 | |
| 9,483,201 B2* | 11/2016 | Kripalani | G06F 3/065 | |
| 9,483,361 B2* | 11/2016 | Gokhale | G06F 11/1464 | |
| 9,483,362 B2* | 11/2016 | Gokhale | G06F 11/1464 | |
| 9,483,363 B2* | 11/2016 | Gokhale | G06F 11/1464 | |
| 9,483,364 B2* | 11/2016 | Gokhale | G06F 11/1464 | |
| 9,513,837 B2* | 12/2016 | Jenkins | G06F 3/0611 | |
| 9,521,193 B2* | 12/2016 | Lee | H04L 67/1095 | |
| 9,563,518 B2* | 2/2017 | Klose | G06F 11/1464 | |
| 9,830,239 B2* | 11/2017 | Nazari | H04L 41/0668 | |
| 9,864,717 B2* | 1/2018 | Krause | H04L 47/10 | |
| 9,875,026 B2* | 1/2018 | Ballard | G06F 3/0682 | |
| 2005/0033757 A1* | 2/2005 | Greenblatt | G06F 17/30067 | |
| 2005/0102547 A1* | 5/2005 | Keeton | G06F 11/008 | 714/1 |
| 2009/0077004 A1* | 3/2009 | Anglin | G06F 11/1469 | |
| 2009/0077140 A1* | 3/2009 | Anglin | G06F 11/1469 | |
| 2015/0370668 A1* | 12/2015 | Nazari | H04L 41/0668 | 714/6.3 |
| 2016/0210194 A1* | 7/2016 | Kumarasamy | G06F 17/30575 | |
| 2016/0210203 A1* | 7/2016 | Kumarasamy | G06F 17/30575 | |
| 2016/0283332 A1* | 9/2016 | Kumarasamy | G06F 11/1417 | |
| 2016/0292040 A1* | 10/2016 | Kumarasamy | G06F 11/1451 | |
| 2016/0306560 A1* | 10/2016 | Maranna | G06F 3/0608 | |
| 2016/0306586 A1* | 10/2016 | Dornemann | G06F 3/0664 | |
| 2016/0306712 A1* | 10/2016 | Nallathambi | G06F 3/0619 | |
| 2016/0306820 A1* | 10/2016 | Agrawal | G06F 17/30303 | |
| 2016/0306829 A1* | 10/2016 | Agrawal | G06F 17/30303 | |
| 2016/0313926 A1* | 10/2016 | Mutha | G06F 3/0608 | |
| 2016/0314046 A1* | 10/2016 | Kumarasamy | G06F 11/1435 | |
| 2017/0024152 A1* | 1/2017 | Bhagi | G06F 3/0619 | |
| 2017/0031617 A1* | 2/2017 | Mutha | G06F 3/06 | |
| 2017/0041429 A1* | 2/2017 | Gibson | H04W 4/023 | |
| 2017/0048731 A1* | 2/2017 | Gibson | H04W 24/02 | |
| 2017/0052736 A1* | 2/2017 | Butt | G06F 12/0862 | |
| 2017/0075769 A1* | 3/2017 | Lee | H04L 67/1095 | |
| 2017/0116088 A1* | 4/2017 | Anami | G06F 9/455 | |
| 2017/0177427 A1* | 6/2017 | D'Amato | G06F 11/0727 | |

\* cited by examiner

SATISFYING RECOVERY SERVICE LEVEL AGREEMENTS (SLAS)

BACKGROUND

Data may be backed up from multiple objects (e.g., various applications and systems) onto a single backup storage device such as a tape device. An example backup storage device may only allow one connection at a time from objects that would like to recover data that is stored on the backup storage device.

BRIEF DESCRIPTION OF THE DRAWINGS

The following detailed description references the drawings, wherein.

DETAILED DESCRIPTION

Figure 1:
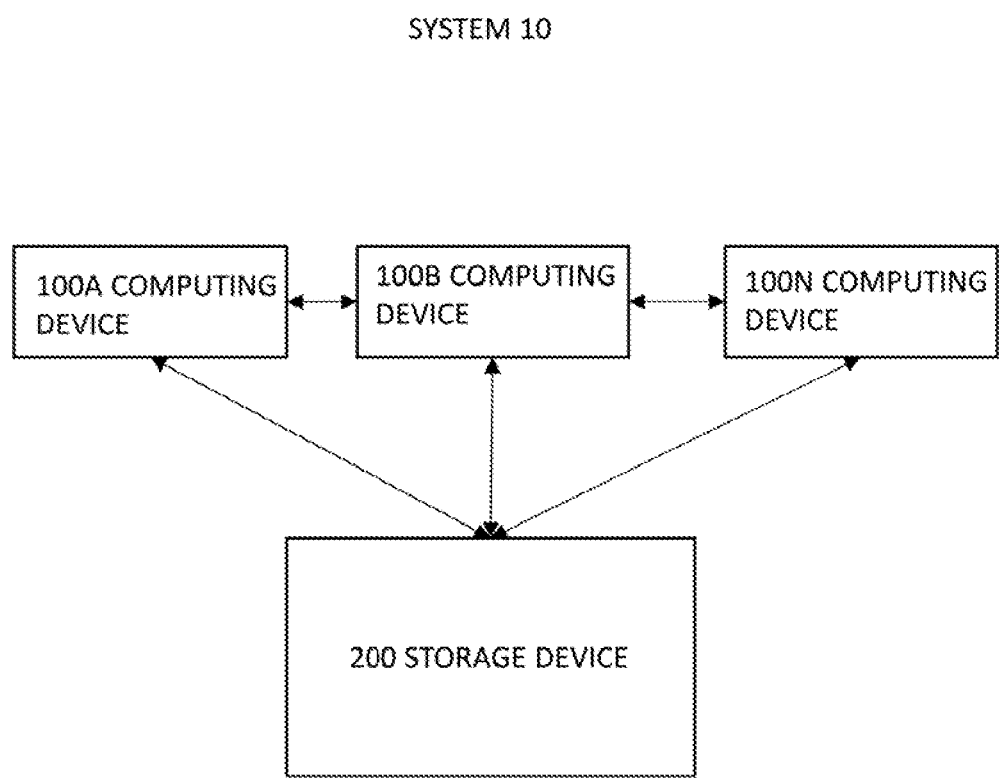
FIG. 1 is a block diagram depicting an example environment in which various examples may be implemented as a system that satisfies recovery SLAs.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for satisfying recovery service level agreements ("SLAs"). The disclosed examples may include systems, devices, computer-readable storage media, and methods for satisfying recovery service level agreements. For purposes of explanation, certain examples are described with reference to the components illustrated in FIGS. 1-7. The functionality of the illustrated components may overlap, however, and may be present in a fewer or greater number of elements and components.

Figure 5:
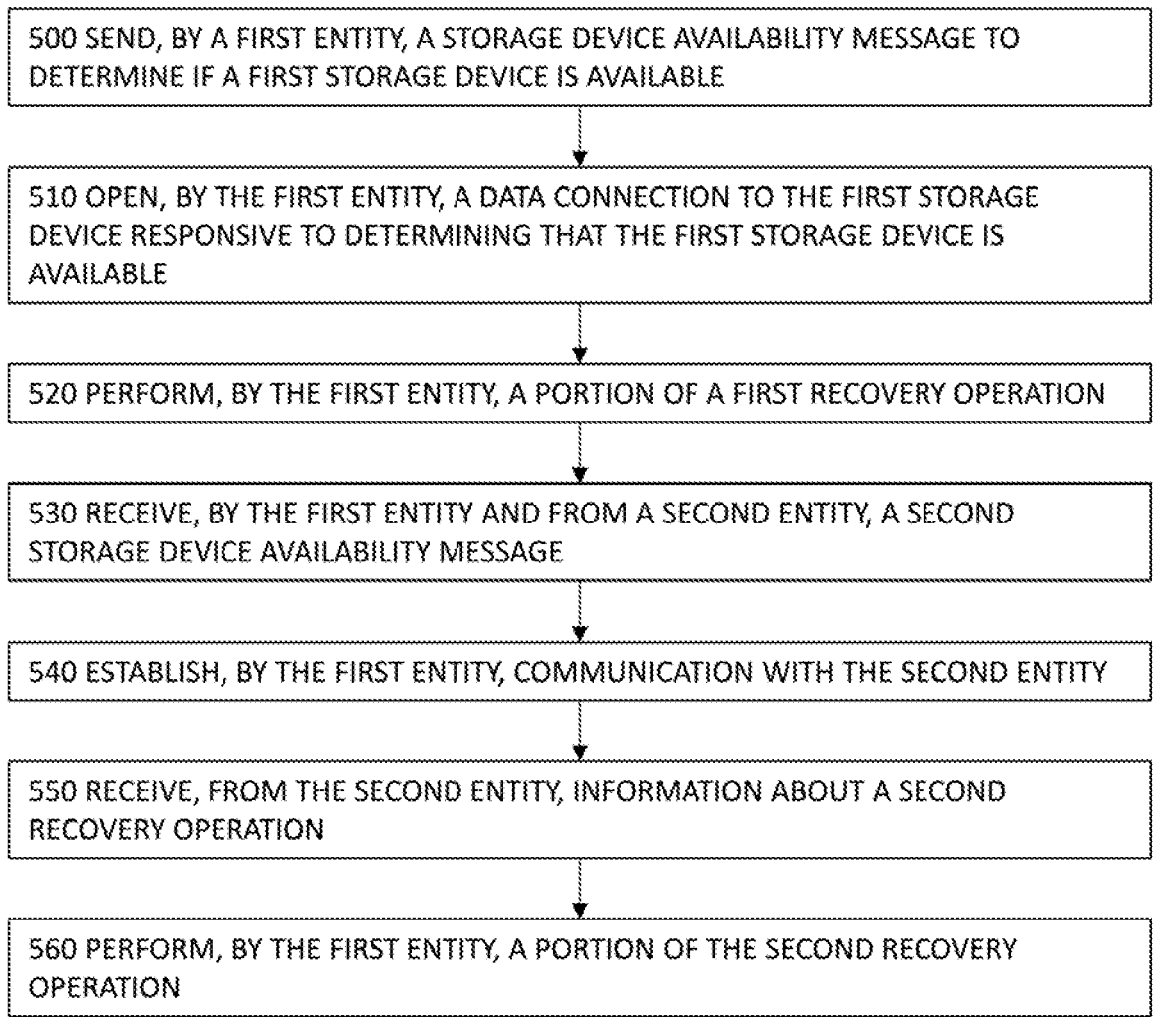
FIG. 5 is a flow diagram depicting an example method for satisfying recovery SLAs.
Figure 6:
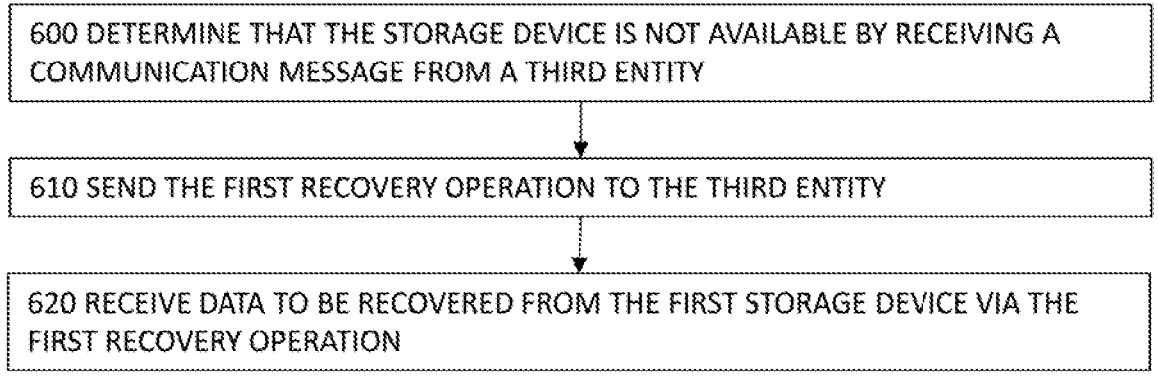
FIG. 6 is a flow diagram depicting an example method for satisfying recovery SLAs.
Figure 7:
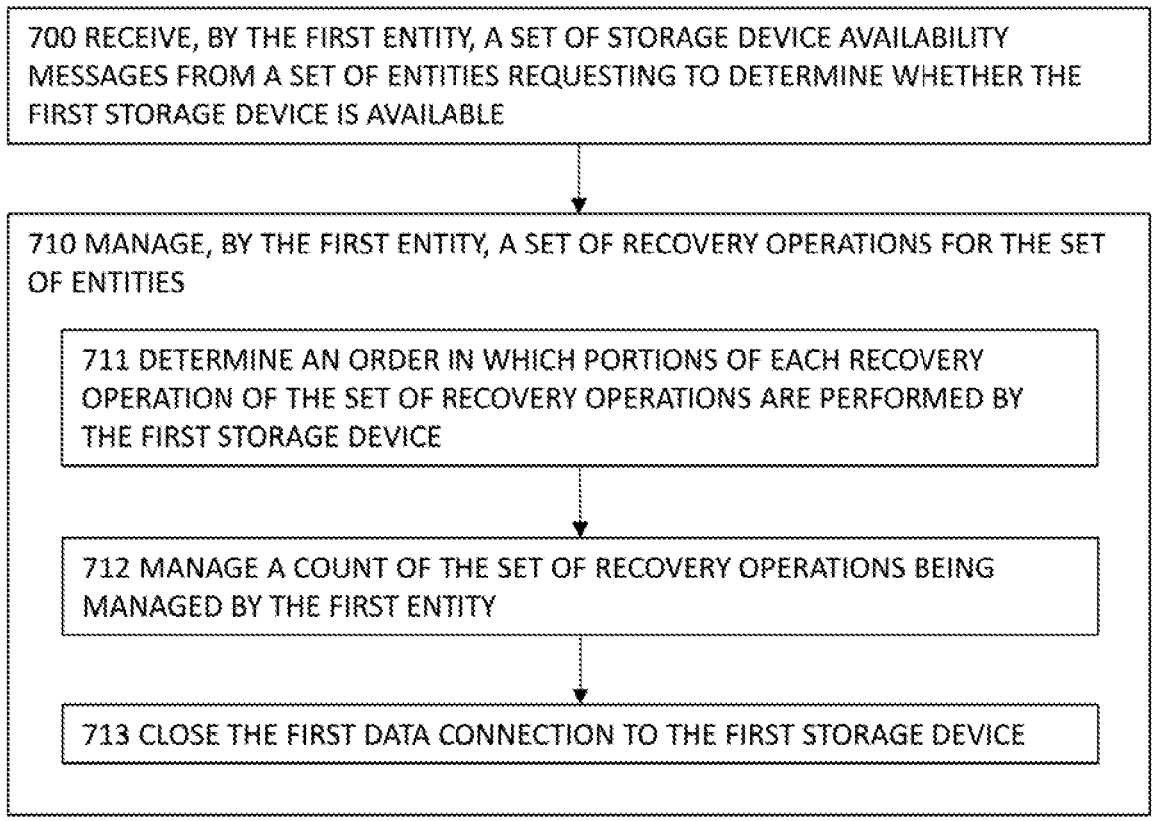
FIG. 7 is a flow diagram depicting an example method for satisfying recovery SLAs.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

Data may be backed up from multiple sources (e.g., various applications and systems) onto a single backup storage device such as a tape device. Backup applications may store business critical data onto storage devices like tape drives, tape libraries, deduplication appliances, virtual tape libraries, and/or other backup storage devices.

An example backup storage device may only allow one connection at a time from objects that would like to recover data that is stored on the backup storage device. For example, an example backup storage device may only allow for a single connection at a time to read data from the backup storage device, and would not allow writing data in parallel to the device to prevent potential data corruption. To that end, unlike disk-based devices, a backup storage device may offer sequential input/output and allow a limited number of parallel connections for data access. Further, once a first recovery operation starts accessing backup data for an entity, other recovery operations may be prevented from accessing the same data on the backup storage device as long as the first recovery operation continues to access backup data. Different data recovery operations that attempt to access different data sets on the same backup storage device may be prevented as well.

These limitations of sequential I/O and limited parallel connections negatively affects the ability to meet recovery service level agreements. In some examples, a recovery service level agreement may require recovery of specific files from a backed up virtual machine and/or other entity. In other examples, a recovery service level agreement may require restore of a virtual machine from multiple incremental backups on a backup storage device. Other examples of recovery service level agreements (related to and unrelated to virtual machines) may be affected as well.

Examples discussed herein address these technological issues by establishing direct or indirect communication among entities requesting recovery operations at a backup storage device to facilitate the performance of those recovery operations. In particular, a first entity that wants to perform a recovery operation at a backup storage device may either act as a host for other recovery operations from other entities while performing its own recovery operation, or may connect to another entity to have its recovery operation performed.

In some examples, a technical solution that satisfies recovery SLAs may include sending, by a first entity comprising a physical processor that implements machine readable instructions, a storage device availability message that comprises a request to determine whether a first storage device is available. Responsive to determining that the first storage device is available, the first entity may open a data connection to the first storage device. The first entity may perform a portion of a first recovery operation. The first entity may receive, from a second entity, a second storage device availability message that comprises a second request to know whether the first storage device is available. The first entity may facilitate communication with the second entity and may receive, from the second entity, information about a second recovery operation. The first entity may perform a portion of the second recovery operation.

In some examples, the first entity may determine that the first storage device is available based on not receiving a response to its storage device availability message for a predetermined period of time after sending the storage device availability message. The first entity may then establish a connection with the first storage device. In some of these examples, the first entity may broadcast information about this connection, send it to a server that may be communicably coupled to the other devices in the network of the first entity, and/or otherwise provide knowledge of the connection.

The first entity may receive storage device availability messages from other entities (or requests to perform recovery operations without the storage device availability message from other entities). The first entity may manage the performance of its recovery operation and the recovery operations of other entities with the first storage device. For example, the first entity may determine an order in which portions of recovery operations from itself and other entities may be performed at the first storage device. In another example, the first entity may maintain a count of entities for which it is performing recovery operations. In another example, the first entity may close its connection to the first storage device responsive to finishing its own recovery operation and/or other recovery operations in its queue.

Alternatively, in some examples, the first entity may determine that the first storage device is not available by receiving a communication message from a third entity, where the communication message comprises information for the first entity to establish communication with the third entity. In other examples, the first entity may also check a server communicably coupled to the entities in the network to determine whether an open connection to the first storage device exists, and may determine that the third entity has a connection open to the first storage device. The first entity may send information about the first recovery to the third entity, responsive to establishing communication with the third entity, and may receive the data to be recovered from the first storage device via the first recovery operation.

FIG. 1 is an example environment in which various examples may be implemented as a system 10 that satisfies recovery SLAs. In some examples, system 10 that satisfies recovery SLAs may include various components such as a server computing device or computing device, a set of computing devices (e.g., computing devices 100, 1008, . . . , 100N, and a storage device 200. Each computing device (e.g., computing device 100) may communicate to and/or receive data from the server or computing device, the set of computing devices (e.g., devices 100A, 100B, . . . , 100N), and/or other components in a network. A computing device may comprise a server, a laptop computing device, a desktop computing device, an all-in-one computing device, a tablet computing device, a mobile phone, an electronic book reader, a web server, a cloud server, a mainframe, and/or other hardware device that comprises a physical processor that implements machine readable instructions to perform functionality. In some examples, the computing device may host a virtual machine from which data is backed up or to which data is recovered. Storage device 200 may comprise any storage device that stores backup data (e.g., a tape library, tape drive, deduplication appliance, virtual tape library, and/or other storage device that stores backup data. In some examples, storage device 200 may only be capable of maintaining a single data connection to another device at a time.

According to various implementations, a system that satisfies recovery SLAs and the various components described herein may be implemented in hardware and/or a combination of hardware and programming that configures hardware. Furthermore, in FIG. 1 and other Figures described herein, different numbers of components or entities than depicted may be used.

Figure 1A:
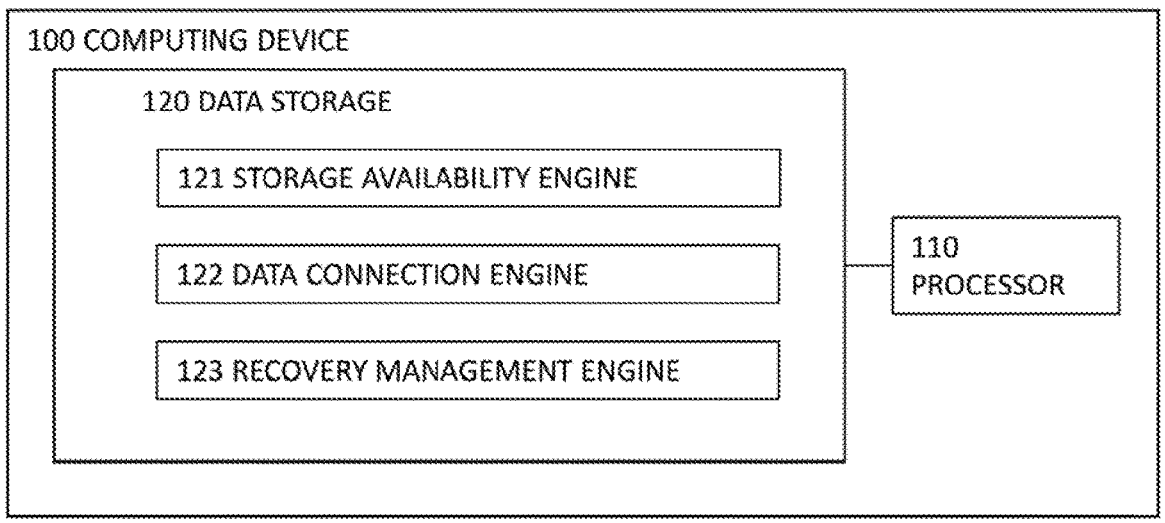
FIG. 1A is a block diagram depicting an example computing device for satisfying recovery SLAs.

FIG. 1A is a block diagram depicting an example computing device for satisfying recovery service level agreements. In some examples, the example computing device 100 may comprise the computing device 100 of FIG. 1. Computing device 100 may comprise a physical processor 110, a storage availability engine 121, a data connection engine 122, a recovery management engine 123, and/or other engines. The term "engine", as used herein, refers to a combination of hardware and programming that performs a designated function. As is illustrated with respect to FIGS. 3-4, the hardware of each engine, for example, may include one or both of a physical processor and a machine-readable storage medium, while the programming is instructions or code stored on the machine-readable storage medium and executable by the processor to perform the designated function.

Storage availability engine 121 may send a storage device availability message that comprises a request to determine whether a storage device 200 is available. Storage availability engine 121 may determine that the storage device 200 is available responsive to not receiving a response to its storage device availability message after a predetermined time period. In some examples, storage availability engine 121 may send a set of storage device availability messages at predetermined intervals and may determine that the storage device is available responsive to not receiving a response to any of the set of storage device availability messages after a predetermined time period.

In some examples, storage availability engine 121 may also check a server communicably coupled to devices in the network to determine whether the storage device 200 is available. In particular, storage availability engine 121 may check a storage of the server to determine whether the storage comprises data indicating an existing connection from another device to the storage device 200.

Storage availability engine 121 may determine that the storage device 200 is not available responsive to receiving a communication message from a third device, where the communication message may comprise information for the first device 100 to establish communication with the third device. In other examples, storage availability engine 121 may determine that the storage device 200 is not available responsive to checking the storage of the server and determining that an existing connection to the storage device 200 exists.

In some examples, storage availability engine 121 may receive a set of storage device availability messages from a set of devices in the network, where each storage device availability message includes information requesting to determine whether the first storage device is available. The set of storage device availability messages may be received in parallel, in sequence, and/or in another manner. Responsive to the device 100 having a data connection with the storage device 200, the storage availability engine 121 may respond to a storage device availability message with a communication message that comprises information on how to connect to the device 100. The storage availability engine 121 may then receive information about a recovery operation from each device in the set of devices. For each device for which it receives information about a recovery operation, storage availability engine 121 may store information about the device, information about a data connection to the device, and/or other information that facilitates performance of a recovery operation on behalf of the device.

In these examples, storage availability engine 121 may ensure that a device that is unable to connect to the storage device 200 because a data connection to that device 200 already exists is still able to connect to another device that will facilitate its recovery operation. Storage availability engine 121 may also prevent race conditions and ensure that only one data connection to the storage device 200 exists at a time. For example, storage availability engine 121 may broadcast information to the other devices in the set of devices that the storage device 200 is not available. The information broadcast to the other devices may also include information about which device of the set of devices has a connection to the storage device 200.

Responsive to determining that the storage device 200 is available, the data connection engine 122 may open a data connection to the storage device 200. In some examples, responsive to opening the I/O data connection, data connection engine 122 may broadcast information relating to the data connection to other devices in the network, may store information relating to the data connection in the server, and/or may otherwise provide knowledge of the data connection.

Data connection engine 122 may also facilitate communication between recovery operations within a single device as well as facilitate communication with other devices to perform recovery operations across various devices. For example, data connection engine 122 may establish an IPC communication channel between recovery operations within the device and may establish socket communication channels to other devices in the set of devices. In some examples, data connection engine 122 may send information to other devices to enable the other devices to connect to the device 100. The data connection engine 122 may communicate data recovered for a recovery operation and/or other information to other devices via respective socket communication channels.

Recovery management engine 123 may perform a first recovery operation of the device 100 via the storage device 200. In some examples, recovery management engine 123 may manage a set of recovery operations, wherein the set of recovery operations may include a first recovery operation of the device 100 and other recovery operations received from other devices.

As part of managing the set of recovery operations, recovery management engine 123 may determine an order in which to perform the set of recovery operations. The recovery management engine 123 may maintain a queue of recovery requests, where each request is related to a recovery operation. For example, the recovery management engine 123 may listen to incoming I/O requests from its own recovery operations or from another device for which the recovery management engine 123 is performing a recovery operation, and may include these I/O requests in the queue to be performed. In some examples, responsive to the device having a full queue of recovery operations, the recovery management engine 123 may provide information to a device that the requested recovery operation may not be performed at that time.

In some examples, recovery management engine 123 may determine an order in which portions of each recovery operation are performed by the storage device 200. The recovery management engine 123 may use a load sharing mechanism to determine the order in which portions of each recovery operation of the set of operations is performed.

In some examples, the recovery management engine 123 may determine the priority of each recovery operation by a heuristic that may include some or all of a set of criteria. The set of criteria may include, for example, an amount of data requested by the recovery operation. The set of criteria may also include, for example, an amount of idle time between subsequent I/O requests related to a recovery operation from a device. For example, responsive to an idle time being high, the priority of the request in the queue may be lowered. The set of criteria may also include, for example, the device providing the request for the recovery operation and/or the type of network or connection associated with the device. For example, responsive to the device being accessed by a fiber channel, more data may be transferred in less time, and the priority of that I/O request may be increased. The set of criteria may also include, for example, a number of available connections to the device, a number of connections over which the device sends I/O requests related to its recovery operation, and/or other information related to the device connection. The set of criteria may also include, for example, an availability of a cache to store the data being recovered.

In some examples, the recovery management engine 123 may manage the handling of a cache, I/O repository, and/or other storage for the I/O requests related to the recovery operations and/or the data being recovered from the storage device 200. The recovery management engine 123 may manage allocation/de-allocation of a cache for a specific storage device 200 (e.g., such that each storage device from which the device 100 is recovering data is associated with its own cache). In some examples, the recovery management engine 123 may read/write data from/to specific cache segments and may manage race conditions during the read/write operations.

As part of managing the set of recovery operations, recovery management engine 123 may also manage a count of the set of recovery operations being managed by the first entity. The recovery management engine 123 may increment or decrement the count responsive to receiving another request to perform a recovery operation or responsive to completing a recovery operation for a device, respectively.

In some examples, responsive to completing a recovery operation for a device, recovery management engine 123 may delete information about the device from its storage (i.e., a non-transitory storage medium of device 100).

Recovery management engine 123 may also facilitate closing the data connection to the storage device 100. In some examples, recovery management engine 123 may close the data connection to the storage device 200 responsive to its own recovery operations being completed, and may inform another device for which it has a recovery operation to perform to instead open the data connection to the storage device 200 and manage the remainder of the set of recovery operations. In some examples, recovery management engine 123 may close the data connection responsive to determining that the count of recovery operations is zero.

In performing their respective functions, engines 121-123 may access data storage 120 and/or other suitable database(s). Data storage 120 may represent any memory accessible to the computing device 100 that can be used to store and retrieve data. Data storage 120 and/or other databases communicably coupled to the computing device may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The computing device 100 that satisfies recovery SLAs may access data storage 120 locally or remotely via a network.

Data storage 120 may include a database to organize and store data. The database may reside in a single or multiple physical device(s) and in a single or multiple physical location(s). The database may store a plurality of types of data and/or files and associated data or file description, administrative information, or any other data.

Figure 2:
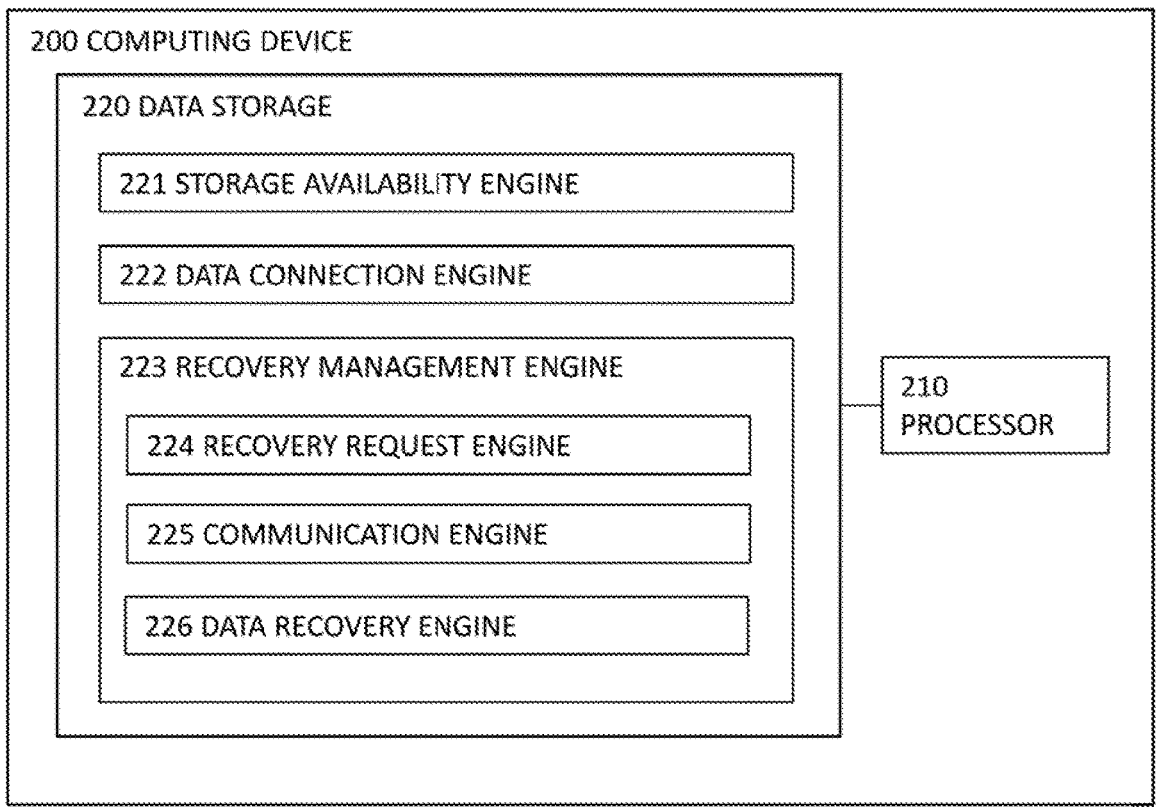
FIG. 2 is a block diagram depicting an example computing device for satisfying recovery SLAs.

FIG. 2 is a block diagram depicting an example computing device 200 that satisfies recovery SLAs. In some examples, example computing device 200 may comprise computing device 100 of FIG. 1. Computing device 200, which may satisfy recovery SLAs, may comprise a physical processor 210, storage availability engine 221, a data connection engine 222, a recovery management engine 223, and/or other engines. In some examples, recovery management engine 223 may comprise recovery request engine 224, communication engine 225, data recovery engine 226, and/or other engines. Engines 221-226 represent engines 121-123, respectively.

Figure 3:
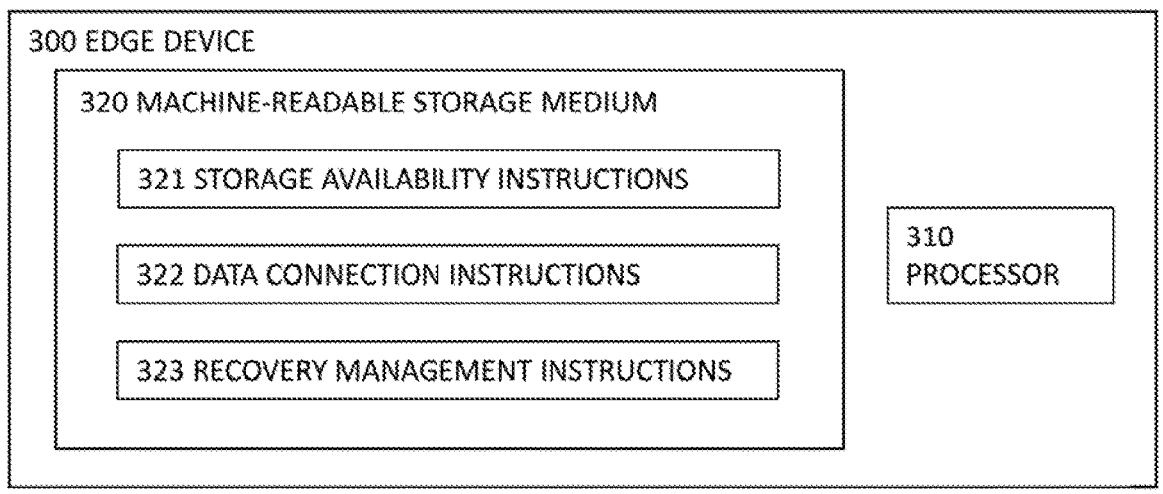
FIG. 3 is a block diagram depicting an example machine-readable storage medium comprising instructions executable by a processor for satisfying recovery SLAs.

FIG. 3 is a block diagram depicting an example machine-readable storage medium 310 comprising instructions executable by a processor for satisfying recovery service level agreements.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements a computing device that satisfies recovery SLAs of FIG. 1.

In FIG. 3, the executable program instructions in machine-readable storage medium 310 are depicted as storage availability instructions 321, data connection instructions 322, recovery management instructions 323, and/or other instructions. Instructions 321-323 represent program instructions that, when executed, cause processor 311 to implement engines 121-123, respectively.

Figure 4:
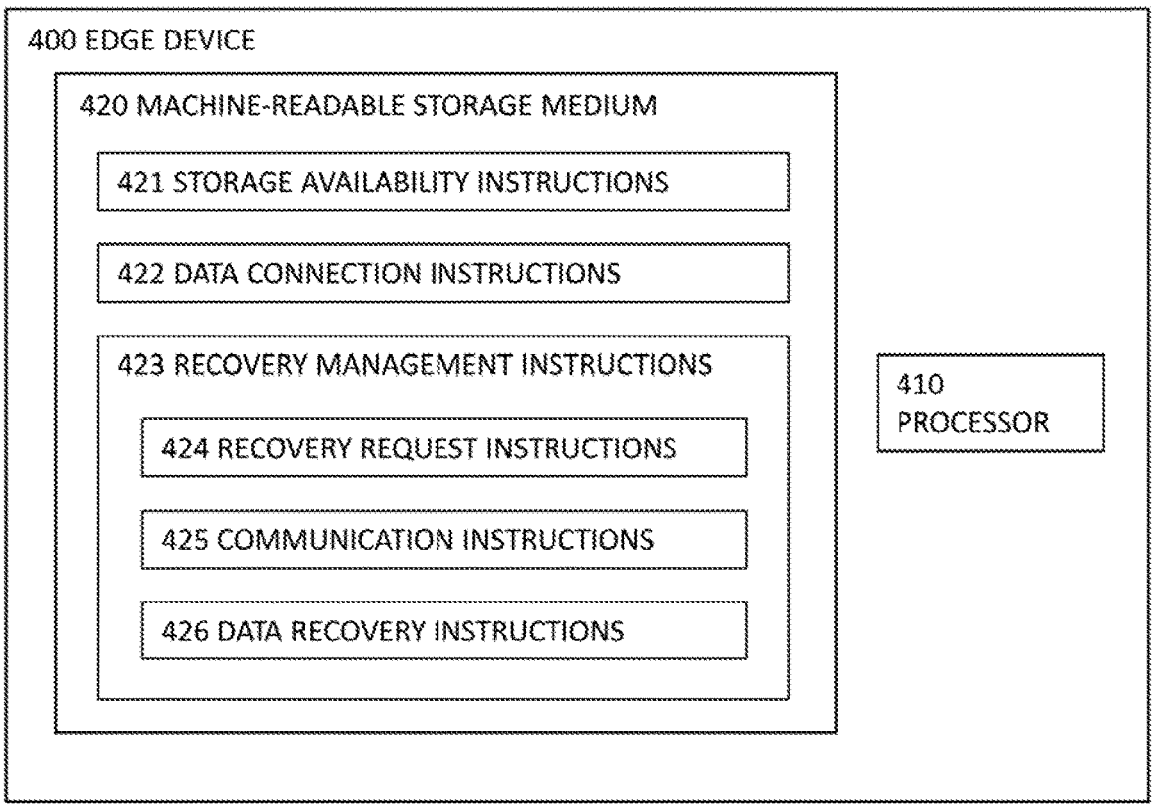
FIG. 4 is a block diagram depicting an example machine-readable storage medium comprising instructions executable by a processor for satisfying recovery SLAs.

FIG. 4 is a block diagram depicting an example machine-readable storage medium 420 comprising instructions executable by a processor for satisfying recovery service level agreements.

In the foregoing discussion, engines 221-226 were described as combinations of hardware and programming. Engines 221-226 may be implemented in a number of fashions. Referring to FIG. 4, the programming may be processor executable instructions 421-426 stored on a machine-readable storage medium 420 and the hardware may include a processor 410 for executing those instructions. Thus, machine-readable storage medium 420 can be said to store program instructions or code that when executed by processor 410 implements a computing device that satisfies recovery SLAs of FIG. 4.

In FIG. 4, the executable program instructions in machine-readable storage medium 410 are depicted as storage availability instructions 421, data connection instructions 422, recovery management instructions 423, recovery request instructions 424, communication instructions 425, data recovery instructions 426, and/or other instructions. Instructions 421-426 represent program instructions that, when executed, cause processor 410 to implement engines 221-226, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 (or processor 410) may represent any number of physical processors capable of executing instructions stored by machine-readable storage medium 320 (or machine-readable storage medium 420). Processor 310 (or processor 410) may be integrated in a single device or distributed across devices. Further, machine-readable storage medium 320 (or machine-readable storage medium 420) may be fully or partially integrated in the same device as processor 310 (or processor 410), or it may be separate but accessible to that device and processor 310 (or processor 410).

In one example, the program instructions may be part of an installation package that when installed can be executed by processor 310 (or processor 410) to implement a computing device that satisfies recovery SLAs. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 321-323, and/or other instructions. As an alternative or in addition to retrieving and executing instructions, processor 310 may include at least one electronic circuit comprising a number of electronic components for performing the functionality of at least one of instructions 321-323, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 421-426, and/or other instructions. As an alternative or in addition to retrieving and executing instructions, processor 410 may include at least one electronic circuit comprising a number of electronic components for performing the functionality of at least one of instructions 421-426, and/or other instructions.

FIG. 5 is a flow diagram depicting an example method 500 for satisfying recovery service level agreements. The various processing blocks and/or data flows depicted in FIG. 5 (and in the other drawing figures such as FIGS. 6, and 7) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 5 as illustrated (and described in greater detail below) is meant be an example and, as such, should not be viewed as limiting. The method of FIG. 5 may be implemented in the form of executable instructions stored on a machine-readable storage medium, such as storage medium 420, and/or in the form of electronic circuitry.

In an operation 500, a first entity may send a storage device availability message to determine if a first storage device is available. For example, the computing device 100 (and/or the storage availability engine 121, the storage availability instructions 321, or other resource of the computing device 100) may send the storage device availability message. The computing device 100 may send the storage device availability message in a manner similar or the same as that described above in relation to the execution of the storage availability engine 121, the storage availability instructions 321, and/or other resource of the computing device 100.

In an operation 510, the first entity may open a data connection to the first storage device response to determining that the first storage device is available. For example, the computing device 100 (and/or the data connection engine 122, the data connection instructions 322 or other resource of the computing device 100) may open the data connection to the first storage device. The computing device 100 may open the data connection to the first storage device in a manner similar or the same as that described above in relation to the execution of the data connection engine 122, the data connection instructions 322, and/or other resource of the computing device 100.

In an operation 520, the first entity may perform a portion of a first recovery operation. For example, the computing device 100 (and/or the recovery management engine 123, the recovery management instructions 323, or other resource of the computing device 100) may perform a portion of a first recovery operation. The computing device 100 may perform a portion of a first recovery operation in a manner similar or the same as that described above in relation to the execution of the recovery management engine 123, the recovery management instructions 323, and/or other resource of the computing device 100.

In an operation 530, the first entity may receive a second storage device availability message from a second entity. For example, the computing device 100 (and/or the recovery management engine 123, the recovery management instructions 323, or other resource of the computing device 100) may receive the second storage device availability message from the second entity. The computing device 100 may receive the second storage device availability message from the second entity in a manner similar or the same as that described above in relation to the execution of the recovery management engine 123, the recovery management instructions 323, and/or other resource of the computing device 100.

In an operation 540, the first entity may establish communication with the second entity. For example, the computing device 100 (and/or the recovery management engine 123, the recovery management instructions 323, or other resource of the computing device 100) may establish communication with the second entity. The computing device 100 may establish communication with the second entity in a manner similar or the same as that described above in relation to the execution of the recovery management engine 123, the recovery management instructions 323, and/or other resource of the computing device 100.

In an operation 550, the first entity may receive, from the second entity, information about a second recovery operation. For example, the computing device 100 (and/or the recovery management engine 123, the recovery management instructions 323, or other resource of the computing device 100) may receive, from the second entity, information about a second recovery operation. The computing device 100 may receive, from the second entity, information about a second recovery operation in a manner similar or the same as that described above in relation to the execution of the recovery management engine 123, the recovery management instructions 323, and/or other resource of the computing device 100.

In an operation 560, the first entity may perform a portion of the second recovery operation. For example, the computing device 100 (and/or the recovery management engine 123, the recovery management instructions 323, or other resource of the computing device 100) may perform a portion of the second recovery operation. The computing device 100 may perform a portion of the second recovery operation in a manner similar or the same as that described above in relation to the execution of the recovery management engine 123, the recovery management instructions 323, and/or other resource of the computing device 100.

FIG. 6 is a flow diagram depicting an example method for satisfying recovery service level agreements. The method of FIG. 6 as illustrated (and described in greater detail below) is meant to be an example and, as such, should not be viewed as limiting. The method of FIG. 6 may be implemented in the form of executable instructions stored on a machine-readable storage medium, such as storage medium 420, and/or in the form of electronic circuitry.

In an operation 600, a determination may be made that the storage device is not available by receiving a communication message from a third entity. For example, the computing device 100 (and/or the storage availability engine 121, the storage availability instructions 321, or other resource of the computing device 100) may determine that the storage device is not available. The computing device 100 may determine that the storage device is not available in a manner similar or the same as that described above in relation to the execution of the storage availability engine 121, the storage availability instructions 321, and/or other resource of the computing device 100.

In an operation 610, a first recovery operation may be sent to the third entity. For example, the computing device 100 (and/or the recovery management engine 123, the recovery management instructions 323, or other resource of the computing device 100) may send the first recovery operation to the third entity. The computing device 100 may send the first recovery operation to the third entity in a manner similar or the same as that described above in relation to the execution of the recovery management engine 123, the recovery management instructions 323, and/or other resource of the computing device 100.

In an operation 620, data to be recovered from the first storage device via the first recovery operation may be received. For example, the computing device 100 (and/or the recovery management engine 123, the recovery management instructions 323, or other resource of the computing device 100) may receive data to be recovered from the first storage device via the first recovery operation. The computing device 100 may receive data to be recovered from the first storage device via the first recovery operation in a manner similar or the same as that described above in relation to the execution of the recovery management engine 123, the recovery management instructions 323, and/or other resource of the computing device 100.

FIG. 7 is a flow diagram depicting an example method for satisfying recovery service level agreements. The method of FIG. 6 as illustrated (and described in greater detail below) is meant to be an example and, as such, should not be viewed as limiting. The method of FIG. 7 may be implemented in the form of executable instructions stored on a machine-readable storage medium, such as storage medium 420, and/or in the form of electronic circuitry.

In an operation 700, the first entity may receive a set of storage device availability messages from a set of entities requesting to determine whether the first storage device is available. For example, the computing device 100 (and/or the recovery management engine 123, the recovery management instructions 323, or other resource of the computing device 100) may receive the set of storage device availability messages. The computing device 100 may receive the set of storage device availability messages in a manner similar or the same as that described above in relation to the execution of the recovery management engine 123, the recovery management instructions 323, and/or other resource of the computing device 100.

In an operation 710, the first entity may manage a set of recovery operations for the set of entities. For example, the computing device 100 (and/or the recovery management engine 123, the recovery management instructions 323, or other resource of the computing device 100) may manage the set of recovery operations for the set of entities. The computing device 100 may manage the set of recovery operations for the set of entities in a manner similar or the same as that described above in relation to the execution of the recovery management engine 123, the recovery management instructions 323, and/or other resource of the computing device 100.

In some examples, operations 711-713 provide an example as to how operation 710 may be performed.

In an operation 711, the first entity may determine an order in which portions of each recovery operation of the set of recovery operations are performed by the first storage device. For example, the computing device 100 (and/or the recovery management engine 123, the recovery management instructions 323, or other resource of the computing device 100) may determine the order in which portions of each recovery operation are performed. The computing device 100 may determine the order in which portions of each recovery operation are performed in a manner similar or the same as that described above in relation to the execution of the recovery management engine 123, the recovery management instructions 323, and/or other resource of the computing device 100.

In an operation 712, the first entity may manage a count of the set of recovery operations being managed by the first entity. For example, the computing device 100 (and/or the recovery management engine 123, the recovery management instructions 323, or other resource of the computing device 100) may manage the count of the set of recovery operations being managed. The computing device 100 may manage the count of the set of recovery operations being managed in a manner similar or the same as that described above in relation to the execution of the recovery management engine 123, the recovery management instructions 323, and/or other resource of the computing device 100.

In an operation 713, the first entity may close the first data connection to the first storage device. For example, the computing device 100 (and/or the recovery management engine 123, the recovery management instructions 323, or other resource of the computing device 100) may close the first data connection to the first storage device. The computing device 100 may close the first data connection to the first storage device in a manner similar or the same as that described above in relation to the execution of the recovery management engine 123, the recovery management instructions 323, and/or other resource of the computing device 100.

The foregoing disclosure describes a number of example implementations for satisfying recovery service level agreements. The disclosed examples may include systems, devices, computer-readable storage media, and methods for satisfying recovery service level agreements. For purposes of explanation, certain examples are described with reference to the components illustrated in FIGS. 1-7. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for satisfying recovery service level agreements (SLAs), the method comprising:

sending, by a first entity comprising a physical processor that implements machine readable instructions, a storage device availability message that comprises a request to determine whether a first storage device is available;
responsive to determining that the first storage device is available:
opening, by the first entity, a data connection to the first storage device, wherein the first entity broadcasts information about the data connection to a set of devices in a network, wherein the information about the data connection indicates which device in the set of devices in the network has a connection to the first storage device;
performing, by the first entity, a portion of a first recovery operation;
receiving, by the first entity and from a second entity, a second storage device availability message that comprises a second request to know whether the first storage device is available;
facilitating, by the first entity, communication with the second entity;
receiving, from the second entity, information about a second recovery operation; and
performing, by the first entity, a portion of the second recovery operation;
determining, by the first entity, that the first storage device is not available by receiving a communication message from a third entity, the communication message comprising information for the first entity to establish communication with the third entity;
responsive to establishing communication with the third entity, sending, by the first entity to the third entity, the first recovery operation; and
receiving, from the third entity, data to be recovered from the first storage device via the first recovery operation.

2. The method of claim 1, wherein determining that the first storage device is available comprises receiving no response for a predetermined period of time after sending the storage device availability message.

3. The method of claim 1, further comprising:
receiving, by the first entity, a set of storage device availability messages from a set of entities requesting to determine whether the first storage device is available;
managing, by the first entity, a set of recovery operations for the set of entities.

4. The method of claim 3, wherein managing the set of recovery operations comprises:
determining, by the first entity, an order in which portions of each recovery operation of the set of recovery operations are performed by the first storage device.

5. The method of claim 3, further comprising:
managing, by the first entity, a count of the set of recovery operations being managed by the first entity;
responsive to the first entity completing the first recovery operation and determining, based on the count of the set of recovery operations being managed, that no recovery operations remain to be performed by the first entity, closing, by the first entity, the data connection to the first storage device.

6. The method of claim 1, further comprising:
responsive to completing the first recovery operation, closing, by the first entity, the data connection to the first storage device;
causing, by the first entity, the second entity to open a second data connection to the first storage device.

7. A non-transitory machine-readable storage medium comprising instructions executable by a physical processor of a computing device for satisfying recovery service level agreements (SLAs), the machine-readable storage medium comprising:
instructions to determine whether a data connection with a first storage device is available, wherein information about the data connection is broadcast via a first entity to a set of devices in a network, wherein the information about the data connection indicates which device in the set of devices in the network has a connection to the first storage device;
instructions to establish the data connection with the first storage device responsive to determining that the first storage device is available, the instructions to establish the data connection comprising:
instruction to perform a first recovery operation at the first storage device; instructions to receive a second storage device availability message from a second entity that requests a second recovery operation at the first storage device;
instructions to facilitate communication with the second entity; and
instructions to perform the second recovery operation at the first storage device and communicate the recovered data to the second entity;
instructions to determine that the first storage device is not available by receiving a communication message from a third entity, the communication message comprising information for the first entity to establish communication with the third entity;
instructions to send the first recovery operation to the third entity responsive to establishing communication with the third entity; and
instructions to receive, from the third entity, data to be recovered from the first storage device via the first recovery operation.

8. The non-transitory machine-readable storage medium of claim 7, wherein the instructions to determine whether the data connection with the first storage device is available comprise:
instructions to send a first storage device availability message to determine whether the first storage device is available; and
instructions to determine that the first storage device is available by not receiving a response to the first storage device availability message within a predetermined time period.

9. The non-transitory machine-readable storage medium of claim 7, further comprising:
instructions to receive a set of storage device availability messages from a set of entities requesting to determine whether the first storage device is available; and
instructions to manage a set of recovery operations from the set of entities.

10. The non-transitory machine-readable storage medium of claim 9, further comprising:
instructions to determine an order in which portions of each recovery operation of the set of recovery operations are performed by the first storage device.

11. The non-transitory machine-readable storage medium of claim 9, further comprising:
instructions to manage a count of the set of recovery operations being managed by the first entity; and
instructions to close the data connection to the first storage device responsive to completing the first recovery operation and determining, based on the count of the set of recovery operations being managed, that no recovery operations remain to be performed.

12. The non-transitory machine-readable storage medium of claim 7, further comprising:
   instructions to close the data connection to the first storage device responsive to completing the first recovery operation; and
   instructions to cause the second entity to open a second data connection to the first storage device.

13. A system for satisfying recovery service level agreements (SLAs), the system comprising:
   a physical processor that implements machine readable instructions that cause the system to:
   determine that a first recovery operation is to be performed at a first storage device;
   determine that the first storage device is available; responsive to determining that the first storage device is available, establish a data connection with the first storage device, wherein information about the data connection is broadcast via a first entity to a set of devices in a network, wherein the information about the data connection indicates which device in the set of devices in the network has a connection to the first storage device;
   receive a second storage device availability from a second entity that requests a second recovery operation at the first storage device;
   facilitate communication with the second entity;
   manage the execution of the first recovery operation and the second recovery operation;
   determine that the first storage device is not available by receiving a communication message from a third entity, the communication message comprising information for the first entity to establish communication with the third entity;
   send the first recovery operation to the third entity responsive to establishing communication with the third entity; and
   receive, from the third entity, data to be recovered from the first storage device via the first recovery operation.

14. The system of claim 13, wherein the physical processor implements machine readable instructions that cause the system to determine that the first storage device is available by:
   sending a storage device availability message to a set of entities; and
   receiving no response for a predetermined amount of time after sending the storage device availability message.

15. The system of claim 13, wherein the physical processor implements machine readable instructions that cause the system to:
   receive a set of storage device availability messages from a set of entities requesting to determine whether the first storage device is available; and
   manage a set of recovery operations from the set of entities.

16. The system of claim 13, wherein the physical processor implements machine readable instructions that cause the computing device to:
   manage a count of the set of recovery operations being managed by the first entity; and
   close the data connection to the first storage device responsive to completing the first recovery operation and determining, based on the count of the set of recovery operations being managed, that no recovery operations remain to be performed.

17. The computing device of claim 13, wherein the physical processor implements machine readable instructions that cause the system to:
   close the data connection to the first storage device responsive to completing the first recovery operation; and
   cause the second entity to open a second data connection to the first storage device.

* * * * *